(12) United States Patent
Kim et al.

(10) Patent No.: US 8,609,018 B2
(45) Date of Patent: Dec. 17, 2013

(54) ELECTRODE FOR SUPERCAPACITOR HAVING MANGANESE OXIDE-CONDUCTIVE METAL OXIDE COMPOSITE LAYER, FABRICATION METHOD THEREOF, AND SUPERCAPACITOR COMPRISING SAME

(75) Inventors: Il Doo Kim, Seoul (KR); Doo Young Youn, Seongnam-si (KR)

(73) Assignee: Korea Institute of Science and Technology, Seoul (KR)

( * ) Notice: Subject to any disclaimer, the term of this patent is extended or adjusted under 35 U.S.C. 154(b) by 349 days.

(21) Appl. No.: 12/580,098

(22) Filed: Oct. 15, 2009

(65) Prior Publication Data
US 2010/0033903 A1    Feb. 11, 2010

(30) Foreign Application Priority Data
Nov. 5, 2008    (KR) .................. 10-2008-0109179

(51) Int. Cl.
*B28B 1/32*    (2006.01)
*C04B 35/01*    (2006.01)
*C04B 35/64*    (2006.01)

(52) U.S. Cl.
USPC .......................................... 264/615

(58) Field of Classification Search
USPC ................................ 264/465, 615
See application file for complete search history.

(56) References Cited

U.S. PATENT DOCUMENTS

2004/0047798 A1    3/2004    Oh et al.
2010/0002357 A1*   1/2010    Kim et al. ............... 361/305

FOREIGN PATENT DOCUMENTS

| JP | 2002-289468 A | 10/2002 |
|---|---|---|
| JP | 2004-503456 A | 2/2004 |
| JP | 2005-209866 A | 8/2005 |
| JP | 2005-223089 A | 8/2005 |
| KR | 0622737 | 5/2006 |
| KR | 1020080066495 A | 7/2008 |
| WO | 2005/071702 A1 | 8/2005 |

OTHER PUBLICATIONS

Chang et al. "Effects of the Co content in the material characteristics of supercapacitive performance of binary Mn-Co oxide electrodes." Journal of Alloys and Compounds, 461 (2008) 667-674.*
Shao et al. "Preparation of Mn2O3 and Mn3O4 nanofibers via an electrospinning technique." Journal of Solid State Chemistry, 177 (2004) 2628-2631.*
Doo-Young Youn, et al; "Facile Synthesis of Highly Conductive RuO$_2$-Mn$_3$O$_4$ Composite Nanofibers via Electrospinning and Their Electrochemical Properties", Journal of The Electrochemical Society, 158(8) pp. A970-A975, published Jun. 23, 2011.

* cited by examiner

*Primary Examiner* — Joseph S Del Sole
*Assistant Examiner* — Erin Snelting
(74) *Attorney, Agent, or Firm* — Ladas & Parry LLP

(57) ABSTRACT

The present invention provides an electrode for a supercapacitor, a fabrication method thereof, and a supercapacitor comprising the same. The electrode exhibits enhanced specific capacitance and electrical conductivity, among others, due to the fact that it comprises a porous composite metal oxide layer which has the structure of a web of entangled nanofibers or has a nanoparticle network structure.

9 Claims, 9 Drawing Sheets

ELECTRODE FOR SUPERCAPACITOR HAVING MANGANESE OXIDE-CONDUCTIVE METAL OXIDE COMPOSITE LAYER, FABRICATION METHOD THEREOF, AND SUPERCAPACITOR COMPRISING SAME

FIELD OF THE INVENTION

The present invention relates to an electrode for a supercapacitor having excellent specific capacitance, electrical conductivity, mechanical stability, thermal stability, and electrical stability, a fabrication method thereof, and a supercapacitor using the same.

BACKGROUND OF THE INVENTION

There has recently been a growing demand for environmentally friendly hybrid electric vehicles (HEVs), and to improve the efficiency of HEV power systems, there is a need for the use of electrochemical capacitors that are capable of supplying a large amount of current within a much shorter time than the existing battery systems for energy storage.

Such electrochemical capacitors can be broadly classified into two types: an electrical double-layer capacitor having an electrical double layer formed between a carbon-based electrode and an electrolyte; and a supercapacitor that exploits the pseudocapacitance generated by the reversible faradaic surface redox reaction at the electrode/electrolyte interface, and stores the generated charges.

Electrodes for such supercapacitors are mainly made using conductive polymers (e.g., polyaniline and polypyrrole) or metal oxides. A supercapacitor having an electrode made of a conductive polymer may have a specific capacitance of up to 800 F/g, but it is disadvantageous in terms of long-term life stability and cycle characteristics, which limits the commercialization of such a supercapacitor. In contrast, transition metal oxide-based supercapacitors have attracted increasingly more attention due to their high specific capacitance, long operation time, and high output. In particular, numerous studies have focused on the application of a $RuO_2$ electrode having high electrical conductivity and specific capacitance. However, the cost of expensive $RuO_2$ impedes the fabrication of such an electrode for a supercapacitor on a commercial scale despite its excellent supercapacitive properties.

Electrode materials such as $MnO_2$, $NiO_x$, $CoO_x$, $V_2O_5$, and $MoO_3$ have also been studied as potential replacements for $RuO_2$, particularly, environmentally friendly and inexpensive manganese oxide ($MnO_2$). In order to use manganese oxide having a lower electrical conductivity than $RuO_2$ for the manufacture of a supercapacitor with high-rate characteristics, it is important to increase the electrical conductivity of the electrode material. Accordingly, many efforts have been made to improve the electrical conductivity of manganese oxide-based supercapacitors. For instance, a thin manganese oxide coating disposed on the surface of a carbon material (e.g., carbon black, carbon nanotubes, or vapor grown carbon fibers) has been studied to achieve supercapacitive properties on the manganese oxide layer and to attain high-rate characteristics based on the high electrical conductivity of the carbon material.

For example, Korean Patent No. 622737 discloses an electrode for a supercapacitor that is fabricated by adding a carbon material, such as carbon black, carbon nanotubes, or vapor grown carbon fibers to a manganese solution and controlling the redox reaction between the carbon material such that a thin manganese oxide layer is formed on the surface of the carbon material.

According to another well-known method, an electrode for a supercapacitor is fabricated by mixing manganese oxide nanoparticles, a conductor, and a binder to prepare a paste, and coating the paste on a current collector. However, this method has a disadvantage in that the supercapacitive properties (e.g., specific capacitance) of the electrode deteriorate as the amounts of the conductor and the binder increase.

SUMMARY OF THE INVENTION

Accordingly, it is an object of the present invention to provide an electrode for a supercapacitor that has excellent specific capacitance, electrical conductivity, mechanical stability, thermal stability, and electrical stability.

It is another object of the present invention to provide a supercapacitor comprising the electrode.

It is a further object of the present invention to provide a method for fabricating the electrode on a commercial scale in a simple and economical manner.

In accordance with one aspect of the present invention, there is provided an electrode for a supercapacitor, comprising a current collector, and a porous composite metal oxide layer deposited on at least one surface of the current collector, wherein the porous composite metal oxide layer is of the form of a web of entangled ultrafine fibers formed by spinning under an applied electric field, and heat-treating thereafter, which comprises nanoparticles of manganese oxide and a conductive metal oxide whose electrical conductivity is higher than that of manganese oxide.

In accordance with another aspect of the present invention, there is provided a supercapacitor comprising the electrode.

In accordance with a further aspect of the present invention, there is provided a method for fabricating the electrode for a supercapacitor of claim 1, comprising: mixing a manganese oxide precursor, a precursor of a conductive metal oxide having a higher electrical conductivity than manganese oxide, and a polymer, to prepare a spinning solution; spinning the spinning solution on a current collector under an electric field to form a web of entangled ultrafine fibers, the ultrafine fiber web being composed of the manganese oxide precursor, the conductive metal oxide precursor, and the polymer; performing primary thermal treatment of the ultrafine fiber web to partially or completely melt the polymer present in the ultrafine fiber web, the thermal treatment being performed by a process selected from the group consisting of thermal pressing, thermal pressurization, and annealing; and removing the polymer from the ultrafine fiber web by secondary thermal treatment to form a porous composite metal oxide layer.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

The present invention provides an electrode for a supercapacitor which comprises a current collector and a porous composite metal oxide layer deposited on at least one surface of the current collector.

The porous composite metal oxide layer is formed by depositing a web of entangled ultrafine fibers on the current collector by spinning under an applied electric field, followed by thermal-treating. Further, the porous composite metal oxide layer contains nanoparticles of manganese oxide and a conductive metal oxide whose electrical conductivity is higher than that of manganese oxide.

Specifically, the nanoparticles may be in a state in which the conductive metal oxide forms a solid solution with the manganese oxide or the manganese oxide is dissolved in the conductive metal oxide. Alternatively, the manganese oxide and the conductive metal oxide may exist in separated different phases.

For improving the specific capacitance, it is preferred that the manganese oxide-rich nanoparticles have an amorphous structure or a structure in which nanocrystalline phase is present in the amorphous structure. For enhancing the electrical conductivity, it is preferred that the conductive metal oxide-rich nanoparticles have a crystalline structure. Such structures can be attained by controlling the contents of the manganese oxide precursor and the conductive metal oxide precursor while adjusting the thermal treatment temperature.

The web of entangled nanofibers comprising the nanoparticles of the porous composite metal oxide layer may be attained by maintaining the fiber form while spinning. The nanofibers may be prepared in the form of a flat belt when thermal pressing or thermal pressurization is performed between the thermal treatment and the spinning steps.

It is preferred that the nanoparticles have an average diameter of 2 to 30 nm and the nanofibers have an average diameter of 50 to 3,000 nm. The average diameter of the nanoparticles and the nanofibers may be varied by controlling the contents of the precursors while controlling the thermal treatment temperature. Depending on the extent of the thermal pressing or thermal pressurization, the nanofiber web structure may convert to a nanoparticle network structure.

The conductive metal oxide has superior electrical conductivity to manganese oxide and is used to achieve supercapacitive properties, including high-rate characteristics. As the conductive metal oxide, preferred is a metal oxide that is readily crystallized by low-temperature thermal treatment (for example, 300° C.) to achieve high electrical conductivity. Accordingly, it is preferred that the conductive metal oxide is selected from the group consisting of ruthenium oxide (e.g., $RuO_2$), iridium oxide (e.g., $IrO_2$), nickel oxide (e.g., NiO), tin oxide (e.g., $SnO_2$), indium oxide (e.g., $In_2O_3$), vanadium oxide (e.g., $V_2O_5$), tungsten oxide (e.g., $WO_3$), cobalt oxide (e.g., CoO, $Co_2O_3$ and $Co_3O_4$), molybdenum oxide (e.g., $MoO_3$), and a mixture thereof.

The equivalent ratio of the manganese oxide to the conductive metal oxide, (manganese oxide)$_{1-x}$(conductive metal oxide)$_x$, present in the porous composite metal oxide layer is preferably $1-x:x(0.1 \leq x \leq 0.5)$.

Examples for the current collector includes, but are not limited to, platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), copper (Cu), titanium (Ti), tungsten (W), In-doped $SnO_2$ (ITO), and F-doped $SnO_2$ (FTO).

The present invention also provides a supercapacitor comprising the electrode.

A general supercapacitor is comprised of an electrode (including a current collector, and a metal oxide layer), an electrolyte, a separator, a case, and a terminal. The supercapacitor of the present invention has the same structure as the general supercapacitor except for the electrode.

Any material that is capable of inducing an electrochemical reaction with the porous composite metal oxide layer of the electrode may be used without particular limitation as the electrolyte. Examples of the electrolyte include, but are not limited to, $Na_2SO_4$, $(NH_4)_2SO_4$, KOH, LiOH, $LiClO_4$, KCl, $Li_2SO_4$, KOH, and NaCl.

The present invention also provides a method for fabricating the electrode.

Specifically, the method comprises the following steps: (1) preparation of a spinning solution; (2) formation of a web of entangled ultrafine fibers by spinning; (3) primary thermal treatment of the ultrafine fiber web; and (4) formation of a porous composite metal oxide layer by secondary thermal treatment.

Hereinafter, the individual steps of the method will be explained in detail.

Step 1

In this step, a manganese oxide precursor, a precursor of a conductive metal oxide having a higher electrical conductivity than manganese oxide, and a polymer are mixed in a solvent to prepare a spinning solution.

The manganese oxide precursor is a material that can convert to manganese oxide by thermal-treating. Examples for the manganese oxide precursor include, but not limited to, manganese (II) acetylacetonate ($Mn(CH_3COCHCOCH_3)_2$), manganese (III) acetylacetonate ($Mn(C_5H_7O_2)_3$), manganese (III) acetate hydrate ($Mn(CH_3COO)_3.xH_2O$), manganese (III) acetate dihydrate ($Mn(CH_3COO)_3.2H_2O$), manganese (III) acetate tetrahydrate ($Mn(CH_3COO)_2.4H_2O$), manganese (II) nitrate hydrate ($Mn(NO_3)_2.xH_2O$), manganese (II) chloride ($MnCl_2$), manganese (II) chloride hydrate ($MnCl_2.xH_2O$), manganese (III) chloride tetrahydrate ($MnCl_2.4H_2O$), manganese (II) sulfate hydrate ($MnSO_4.xH_2O$), manganese (II) sulfate monohydrate ($MnSO_4.H_2O$), and a mixture thereof.

The conductive metal oxide precursor is a material that can convert to a corresponding metal oxide with high electrical conductivity by thermal-treating, but the conductive metal oxide precursor is not necessarily a conductor. So long as the conductive metal oxide precursor can convert to a corresponding metal oxide having a higher electrical conductivity than manganese oxide by thermal-treating, there is no particular limitation on the kind of the conductive metal oxide precursor. The metal of the conductive metal oxide precursor is selected from the group consisting of Ru, Ir, Sn, In, Ni, Co, W, V, and Mo, and the conductive metal oxide precursor is mixed with the polymer and spun, followed by thermal-treating the resulting material to convert the metal precursor to ruthenium oxide, iridium oxide, nickel oxide, tin oxide, indium oxide, vanadium oxide, tungsten oxide, cobalt oxide or molybdenum oxide. Examples for the conductive metal oxide precursor include a precursor of $RuO_2$, $IrO_2$, NiO, etc. having a higher electrical conductivity than manganese oxide. A composite of a precursor of $V_2O_5$, $WO_3$, CoO, $Co_2O_3$, $Co_3O_4$, $MoO_3$, etc. having a higher electrical conductivity than manganese oxide by thermal-treating at a low temperature (e.g., 300-400° C.) with manganese oxide can also be used.

The polymer increases the viscosity of the solution to form a fiber upon spinning and to control the structure of the spun fiber due to its compatibility with the manganese oxide precursor and the conductive metal oxide precursor. Examples for the polymer include, but not limited to, polyvinyl acetate or a copolymer thereof; polyurethane or a copolymer thereof; a cellulose derivative, such as cellulose acetate, cellulose acetate butylate and cellulose acetate propionate; poly(methyl methacrylate) (PMMA); poly(methyl acrylate) (PMA); a polyacrylic copolymer; polyvinyl alcohol (PVA); polyfurfuryl alcohol (PFFA); polystyrene (PS) or a copolymer thereof; a polyalkylene oxide, such as polyethylene oxide (PEO) and polypropylene oxide (PPO), or a copolymer thereof; a polycarbonate (PC); polyvinyl chloride (PVC); polycaprolactone; polyvinylpyrrolidone (PVP); polyvinyl fluoride; a polyvinylidene fluoride copolymer; a polyamide; and a mixture thereof. There is no particular limitation on the kind of the polymer so long as the polymer is able to maintain a viscosity at which ultrafine fibers can be formed from the spinning solution by a suitable process, such as electrospinning.

Examples for the solvent include, but not limited to, dimethylformamide (DMF), acetone, tetrahydrofuran, toluene, water, and a mixture thereof.

At least one additive may be added to the spinning solution to facilitate the spinning. Examples for the additive include, but not limited to, acetic acid, stearic acid, adipic acid, ethoxyacetic acid, benzoic acid, nitric acid, cetyltrimethylammonium bromide (CTAB), and a mixture thereof.

Step 2

In this step, the spinning solution prepared in Step 1 is spun on at least one surface of the current collector under an electric field to form a web of entangled ultrafine fibers. The ultrafine fiber web is composed of the manganese oxide precursor, the precursor of the conductive metal oxide, and the polymer.

The manganese oxide precursor, the conductive metal oxide precursor, and the polymer undergo phase separation or intermixing upon spinning to form ultrafine fibers composed of the precursors and the polymer. The ultrafine fibers are deposited randomly on the current collector to form a web of entangled ultrafine fibers.

Examples for the spinning process include, but not limited to, electrospinning, melt-blowing, flash spinning, and electrostatic melt-blowing.

Electrospinning was employed in Examples of the present invention. A device suitable for the electrospinning includes a spinning nozzle connected to a pump to quantitatively feed the spinning solution, a high voltage generator, and an electrode (i.e. a current collector) on which a layer composed of spun fibers is formed, etc. The current collector is used as a cathode and the spinning nozzle is used as an anode. The pump controls the amount of the spinning solution discharged per hour. For example, ultrafine fibers having an average diameter of 50 to 3,000 nm can be produced by discharging the spinning solution at a rate of 10 to 50 µl/min while a voltage of 7 to 30 kV is applied. The conditions for the electrospinning (i.e. a distance between a tip and each electrode) may be controlled within a common range. It is preferred to perform the electrospinning until an ultrafine fiber web layer having a thickness of 0.5 to 100 µm is formed on the current collector.

Step 3

In this step, the ultrafine fiber web formed in step 2 is thermally treated to partially or completely melt the polymer present therein. The thermal treatment is performed by a process selected from the group consisting of thermal pressing, thermal pressurization, and annealing.

The thermal pressing or thermal pressurization may be performed by applying a pressure to the ultrafine fiber web at a temperature above the glass transition temperature of the polymer.

Particularly, because the latter process is performed by pressing the ultrafine fiber web using hot compressed air, the latter process is called 'thermal pressurization' to distinguish from 'thermal pressing'.

The ultrafine fiber web may be thermally treated stepwise in the low temperature range (e.g., 50-200° C.) before thermal pressurization at a high temperature to inhibit sudden volatilization of the polymer. The polymer may also be dissolved through evaporation in a closed container filled with a vapor such as ethanol or methanol vapor to increase the adhesion of the ultrafine fiber web to the current collector.

The pressure, temperature and time conditions for the thermal pressing or thermal pressurization are suitably selected taking into consideration the kind and glass transition temperature of the polymer used. Preferably, the thermal pressing or thermal pressurization is performed at a pressure of 0.1 MPa for 60 sec. Taking into consideration the kind and glass transition temperature of the polymer used, the thermal treatment pressure and time are determined in the range of 0.001 to 10 MPa and in the range of 5 sec to 10 min, respectively.

Alternatively, the ultrafine fiber web may be pressed on the current collector by annealing (i.e. primary annealing) at a temperature slightly higher than the glass transition temperature of the polymer, instead of thermal pressing or thermal pressurization to attain the same effects as the thermal pressing or thermal pressurization. It is preferred that the annealing is performed at a temperature ranging from the glass transition temperature of the polymer to 200° C. For the primary annealing, the spinning solution may also be spun while maintaining the temperature of the current collector at the temperature of the glass transition temperature of the polymer or more. Particularly, the polymer having a low glass transition temperature such as polyvinyl acetate (PVAc) may be melted by low-temperature annealing at 50 to 80° C. to achieve increased adhesion to the current collector.

The phase-separated precursors and the polymer are inhibited from flowing therebetween by the above thermal treatment.

As a result of the thermal treatment, the polymer present in the ultrafine fiber web is partially or completely melted to improve the adhesion of the ultrafine fiber web to the current collector. Further, the thermal treatment allows for a peculiar structure with markedly increased specific surface area and density per unit volume after subsequent thermal treatment (i.e. secondary thermal treatment), thus providing a manganese oxide-conductive metal oxide nanoparticle network with markedly increased specific surface area. If the ultrafine fiber web does not undergo thermal treatment, it may be easily separated from the substrate in the subsequent thermal treatment step. Therefore, the thermal treatment including thermal pressing, thermal pressurization or annealing is an indispensable step to make the supercapacitor device stable.

Step 4

In this step, the molten polymer is removed from the ultrafine fiber web formed in the previous step by secondary thermal treatment to form a porous composite metal oxide layer. The secondary thermal treatment is performed by annealing (i.e. secondary annealing).

The secondary annealing temperature and time are determined taking into consideration the temperature at which the polymer is removed, and the degree of crystallization of the manganese oxide and the conductive metal oxide. Since amorphous manganese oxide has better supercapacitive properties than crystalline manganese oxide, the secondary annealing is preferably conducted at a relatively low temperature of 300 to 600° C. The crystal structure of the porous composite metal oxide layer is determined depending on the secondary annealing temperature. For example, the porous composite metal oxide layer may have an amorphous structure or a structure in which partitial nanocrystalline region are partially formed within an amorphous structure. Therefore, the conductive metal oxide is preferably selected from materials that are readily crystallized at a lower temperature than the crystallization temperature of manganese oxide. The use of a metal oxide that is sufficiently crystallized by annealing at a temperature as low as about 300° C. is preferred to impart high electrical conductivity to the porous composite metal oxide layer, thus achieving high-rate supercapacitive properties.

The porous composite metal oxide layer (i.e. a composite film of the manganese oxide and the conductive metal oxide) has a web of entangled nanofibers composed of nanoparticles having an average diameter of 2 to 30 nm, or a nanoparticle network. This structure greatly increases the specific surface area of the porous composite metal oxide layer and facilitates the penetration of an electrolyte between the nanofibers and the nanoparticles, thus maximizing the specific capacitance and electrical conductivity of the electrode for supercapacitor.

Further, the thermal pressing or thermal pressurization greatly improves the adhesion of the current collector to the porous composite metal oxide layer to increase the electrical and mechanical stability of the electrode. The primary annealing (e.g., at a temperature ranging from the glass transition temperature of the polymer to 200° C.) and the subsequent secondary annealing (e.g., 300-600° C.) greatly improve the adhesion of the current collector to the porous composite metal oxide layer to make the electrode highly stable.

The thickness of the porous composite metal oxide layer can be freely varied by controlling the spinning time. That is, the porous composite metal oxide layer may have a thickness varying from a thin film to a thick film.

The following Preparation Examples and Examples are intended to further illustrate the present invention without limiting its scope.

EXAMPLE 1

Fabrication of Electrode 0.84 g of manganese (III) acetylacetonate ($M_w$=352.27, Aldrich) and 0.49 g of ruthenium chloride ($M_w$=207.43) were placed in a 100 mL round bottomed flask. 10 g of dimethyl formamide (DMF, J. T. Baker) was added thereto until they were completely dissolved, and 0.67 mL of acetic acid was added to the resulting solution to facilitate subsequent electrospinning. The mixture thus obtained was stirred for about 1 min and was dissolved in 1.6 g of polyvinyl acetate (PVAc, $M_w$=500,000) while stirring 2 hr to prepare a spinning solution containing the manganese oxide precursor, ruthenium oxide precursor, and PVAc. A small amount of cetyltrimethylammonium bromide was added to the spinning solution to facilitate the subsequent electrospinning.

The spinning solution thus obtained was loaded in a 20 mL syringe and injected the surface of a current collector at a rate of 10 μl/min using a 30 G needle while maintaining a potential difference of about 13-15 kV, to form an ultrafine fiber web layer. A stainless steel (SUS) substrate was used as the current collector. The thickness of the ultrafine fiber web layer was controlled by varying the amount of the spinning solution discharged.

Figure 1:
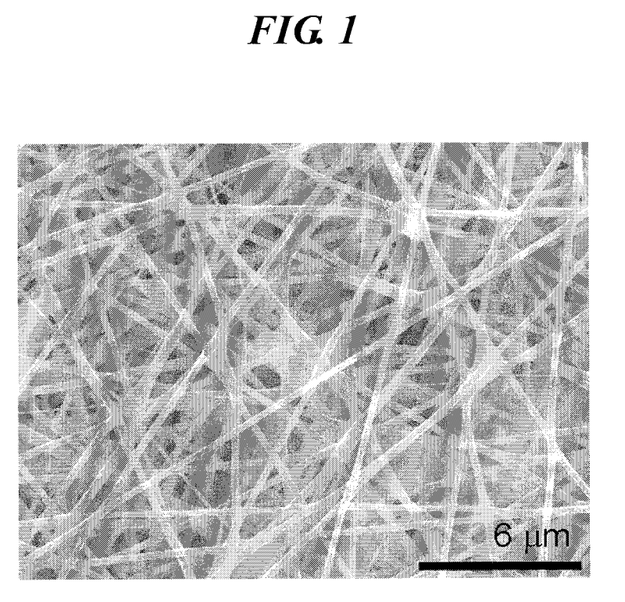
FIG. 1: a scanning electron microscopy (SEM) image of the ultrafine fiber web formed in Example 1.

FIG. 1 is a scanning electron microscopy (SEM) image (magnification 5,000×) of the ultrafine fiber web composed of the manganese oxide precursor, the ruthenium oxide precursor, and the polymer.

As shown in FIG. 1, the ultrafine fiber web had a diameter of 200-300 nm and was in the form of a well connected network.

The ultrafine fiber web was heated at a rate of 5° C./min to 180° C. and was maintained at 180° C. for 10 min (primary annealing) in an electric furnace. Then, the ultrafine fiber web was heated at a rate of 5° C./min to 300° C. and was maintained at 300° C. for 1 hr (secondary annealing) to fabricate an electrode.

Figure 2:
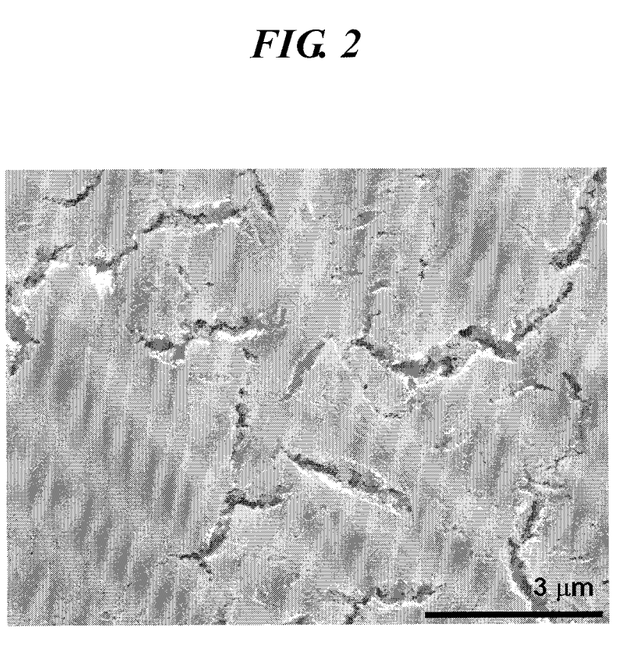
FIG. 2: an SEM image of the porous composite metal oxide layer of the electrode fabricated in Example 1.
Figure 3:
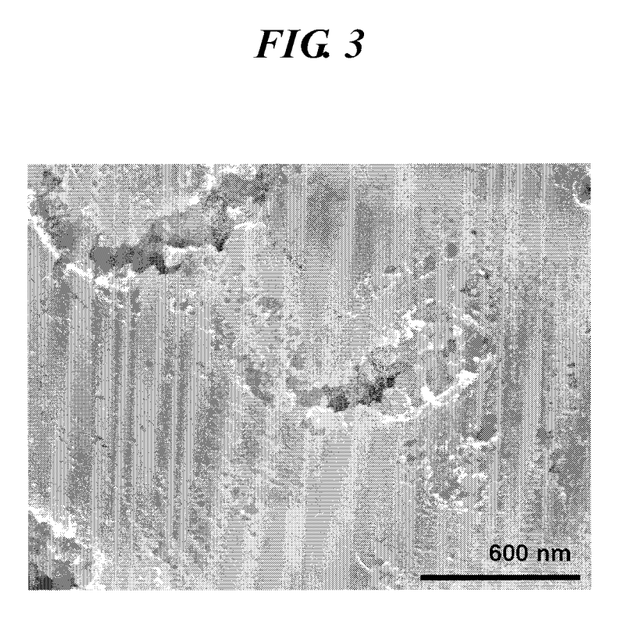
FIG. 3: a high magnification SEM image of the porous composite metal oxide layer of FIG. 2.

FIG. 2 is an SEM image (magnification 10,000×) of the porous composite metal oxide layer of the electrode, and FIG. 3, a high magnification (50,000×) SEM image of a portion of the porous composite metal oxide layer.

As shown in FIG. 2, the continuously coagulated nanofibers form a high density network. As shown in FIG. 3, the nanofibers were entangled with one another to form a porous nanofiber web. Further, the nanofiber web is composed of ultrafine particles having a diameter of 2-10 nm.

EXAMPLE 2

Fabrication of Electrode

The ultrafine fiber web formed in Example 1 was pressed using a laminator (60° C., 0.1 MPa, 60 sec) and annealed at 300° C. for 1 hr to fabricate an electrode including a manganese oxide-ruthenium oxide nanoparticle network.

The pressing pressure and time are factors that change the surface structure of the electrode. Further, the thermal pressing or thermal pressurization temperature was determined depending on the glass transition temperature of the polymer. Particularly, the size of the nanoparticles was easily controlled by varying the secondary annealing temperature.

Figure 4:
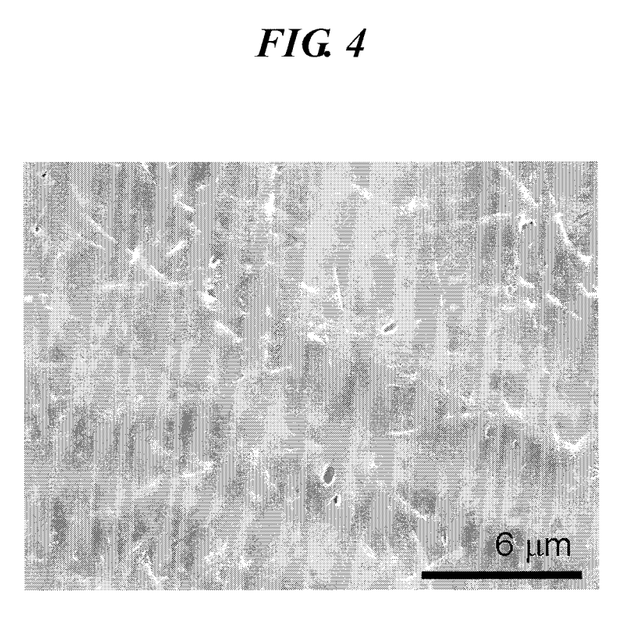
FIG. 4: an SEM image taken after thermal pressing of the ultrafine fiber web in Example 2.

FIG. 4 is an SEM image (magnification 5,000×) taken after the thermal pressing of the ultrafine fiber web of Example 1.

As shown in FIG. 4, the PVAc having a low glass transition temperature was completely melted, and as a result, the nanofibers were entirely connected to one another.

Figure 5:
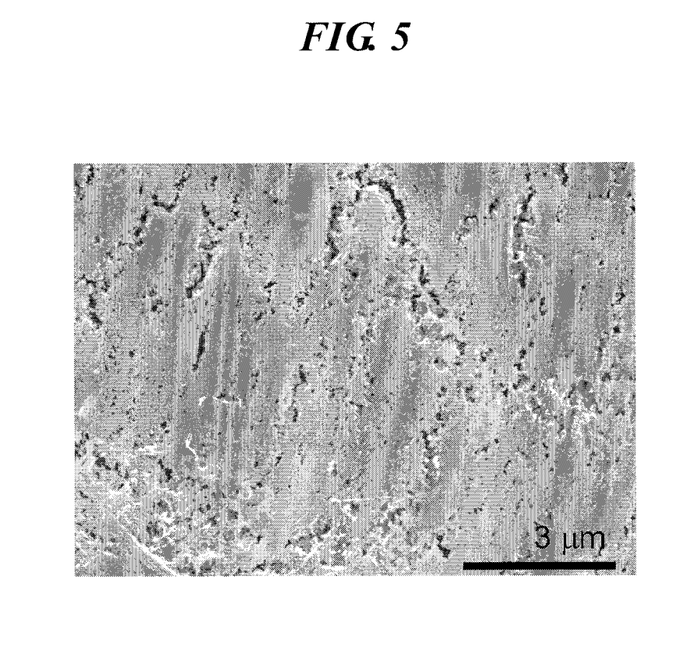
FIG. 5: an SEM image of the porous composite metal oxide layer of the electrode fabricated in Example 2.
Figure 6:
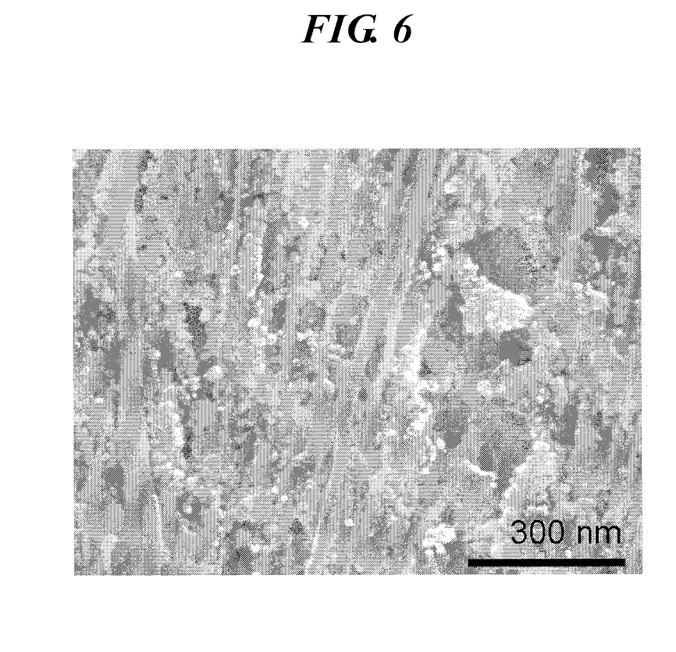
FIG. 6: a high magnification SEM image of the porous composite metal oxide layer of FIG. 5.

FIG. 5 is an SEM image (magnification 10,000×) of the porous composite metal oxide layer of the electrode of Example 2, and FIG. 6, a high magnification (100,000×) SEM image of a portion of the porous composite metal oxide layer.

As shown in FIG. 5, the porous composite metal oxide layer had a web of entangled nanofibers. The nanofiber web was formed more densely than the nanofiber web having undergone primary and secondary annealing without thermal pressing. FIG. 6 clearly shows a very fine manganese oxide-ruthenium oxide nanoparticle network.

The manganese oxide-ruthenium oxide nanofiber web of Example 2 having undergone thermal pressing and secondary annealing had good adhesion to the substrate. This good adhesion enables the manufacture of a supercapacitor with excellent thermal, mechanical and electrical contact properties.

Figure 7:
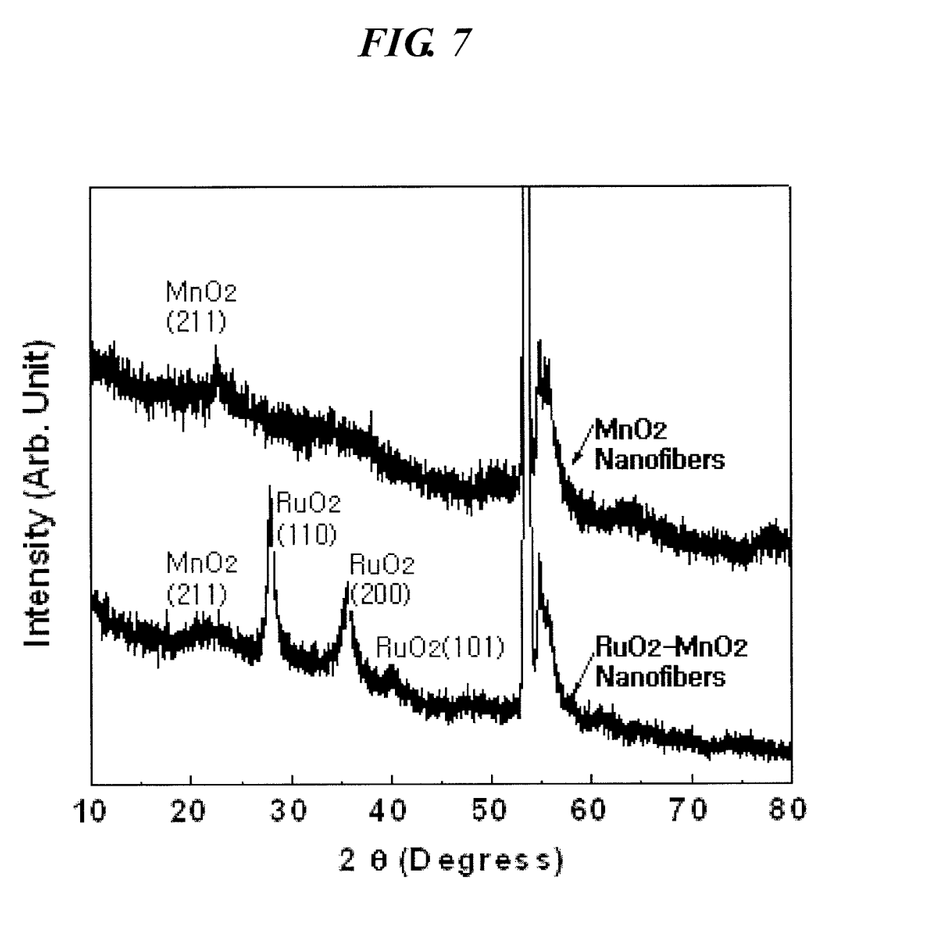
FIG. 7: a X-ray diffraction scan of the porous composite metal oxide layer of the electrode fabricated in Example 2.

FIG. 7 shows a X-ray diffraction (XRD) scan of the porous composite metal oxide layer of the electrode of Example 2. For comparison, nanofiber web composed of manganese oxide only was prepared. The comparative nanofiber web has undergone thermal pressing and secondary annealing at 300° C. The results of XRD scan showed that the comparative nanofiber web had a structure close to an amorphous structure, whereas distinct diffraction peaks corresponding to crystalline ruthenium oxide were observed in the manganese oxide-ruthenium oxide composite nanofiber web of Example 2. The peaks demonstrate that the ruthenium oxide with high electrical conductivity was readily crystallized by low-temperature annealing (300° C.) and the manganese oxide had a crystal structure close to an amorphous structure, suggesting that the porous composite metal oxide layer can be utilized as an electrode material with large capacity as well as excellent sweep rate characteristics due to the presence of ruthenium oxide.

Figure 8:
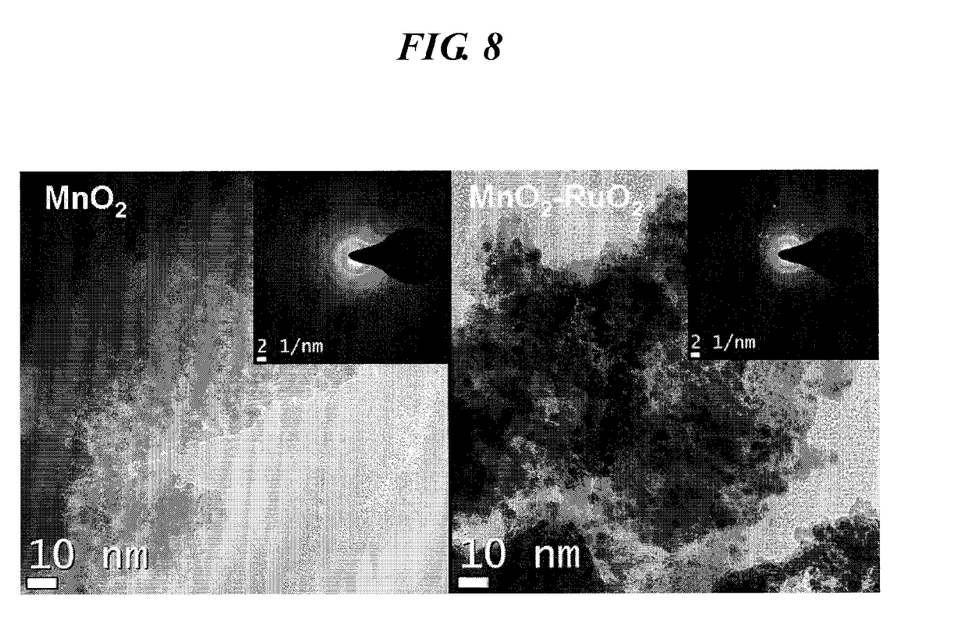
FIG. 8: a transmission electron microscopy (TEM) image of the manganese oxide-ruthenium oxide nanoparticle network of the porous composite metal oxide layer of Example 2, which is compared with a crystalline manganese oxide nanoparticle network.

FIG. 8 shows a transmission electron microscopy (TEM) image of the manganese oxide-ruthenium oxide nanoparticle network of the porous composite metal oxide layer of Example 2, which is compared with a crystalline manganese oxide nanoparticle network. A weakly diffused ring pattern was observed in the selected area diffraction pattern of the comparative manganese oxide nanoparticle network structure, and no crystal lattices were observed even within the particles, indicating that the comparative network structure was close to an amorphous phase. These results correspond to the results of X-ray diffraction scan of the comparative nanofiber web composed of $MnO_2$ only (FIG. 7). In contrast, the right TEM image of FIG. 8 shows diffraction patterns of the $RuO_2$ and the amorphous $MnO_2$ particles. From the diffraction patterns, it can be seen that the $RuO_2$ was well crystallized.

EXPERIMENTAL EXAMPLE 1

Electrochemical Characterization

The electrochemical properties of the electrode fabricated in Example 1 as an electrode for a supercapacitor were evaluated.

Cyclic voltammetry is a method that can be used to measure the capacitive behavior of an electrode for a supercapacitor. A good electrode for a supercapacitor shows a high current density and a symmetric profile from left to right like a rectangle in both anodic and cathodic sweeps in the cyclic voltammogram (CV). The electrochemical properties of the electrode were evaluated based on a three-electrode electrochemical measurement. The potential of a saturated calomel electrode (SCE) was in the range of 0 to 1.0 V and the scan rate was from 10 to 2,000 mV/s. 0.1-1 M $Na_2SO_4$ solution was used as an electrolyte and the manganese oxide-ruthenium oxide nanofiber web was used as a working electrode. Ag/AgCl electrode was used as a reference electrode and platinum (Pt) was used as a counter electrode. The superca-pacitive properties of the manganese oxide-ruthenium oxide nanofiber web were evaluated using a stainless steel current collector.

Figure 9:
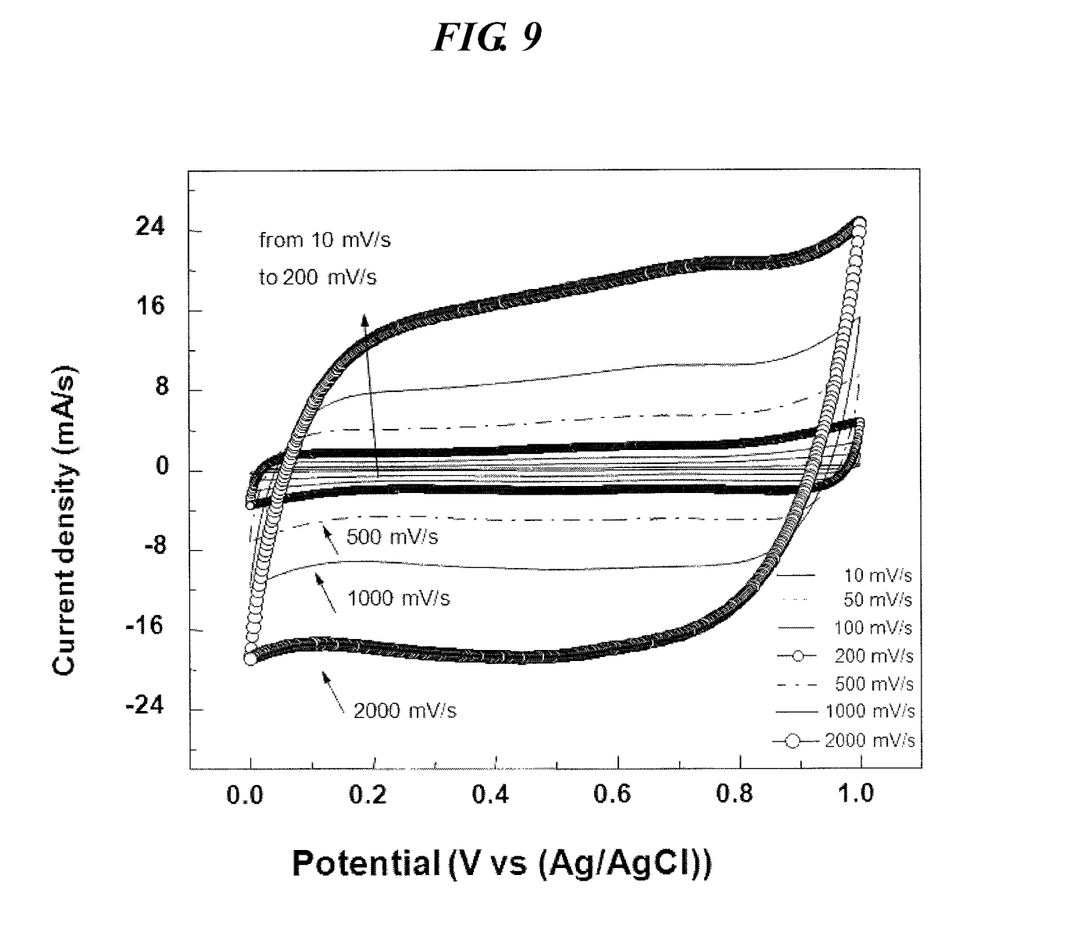
FIG. 9: supercapacitive properties of the electrode fabricated in Example 1.

FIG. 9 shows the supercapacitive properties of the electrode fabricated in Example 1. The thin manganese oxide-ruthenium oxide nanofiber web layer composed of nanoparticles, which had undergone electrospinning, primary annealing at 180° C., and secondary annealing at 300° C., had a large specific surface area. Further, rapid penetration and high reactivity of the electrolyte can be expected because of the nanofiber web structure. As shown in FIG. 9, CV profiles close to a rectangle were observed at varying sweep rates from 10 to 2,000 mV/s.

Figure 10:
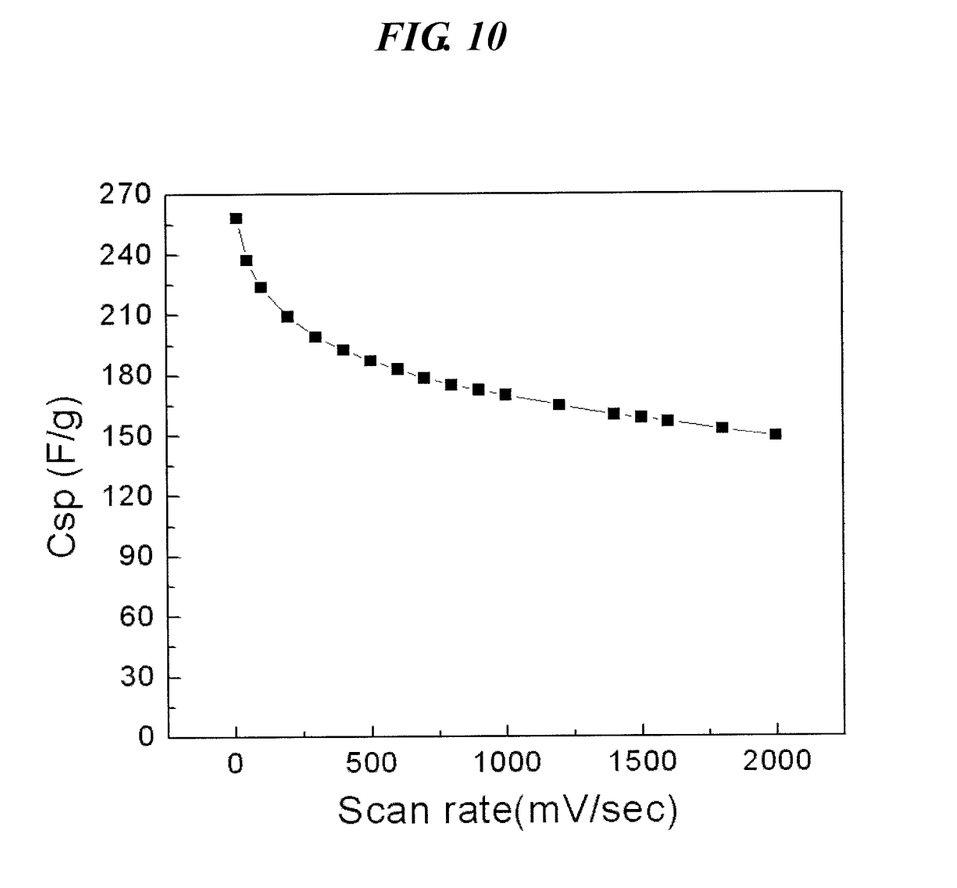
FIG. 10: supercapacitive properties of the electrode fabricated in Example 1 at varying sweep rates.

FIG. 10 shows the specific capacitance ($C_{sp}$) values of the electrode at varying scan rates from 10 to 2,000 mV/s. The electrode had a high initial capacity of 260 F/g at a sweep rate of 10 mV/s and a high specific capacitance of 150 F/g at a high sweep rate of 2,000 mV/s, which were higher than the values obtained in the nanofiber web composed of manganese oxide only. These results are attributed to the rapid migration of electrons due to the high electrical conductivity of the ruthenium oxide. In addition, superior long cycle performance was obtained.

EXPERIMENTAL EXAMPLE 2

Electrochemical Characterization

The electrochemical properties of the electrode fabricated in Example 2 as an electrode for a supercapacitor were evaluated in the same manner as Experimental Example 1.

Figure 11:
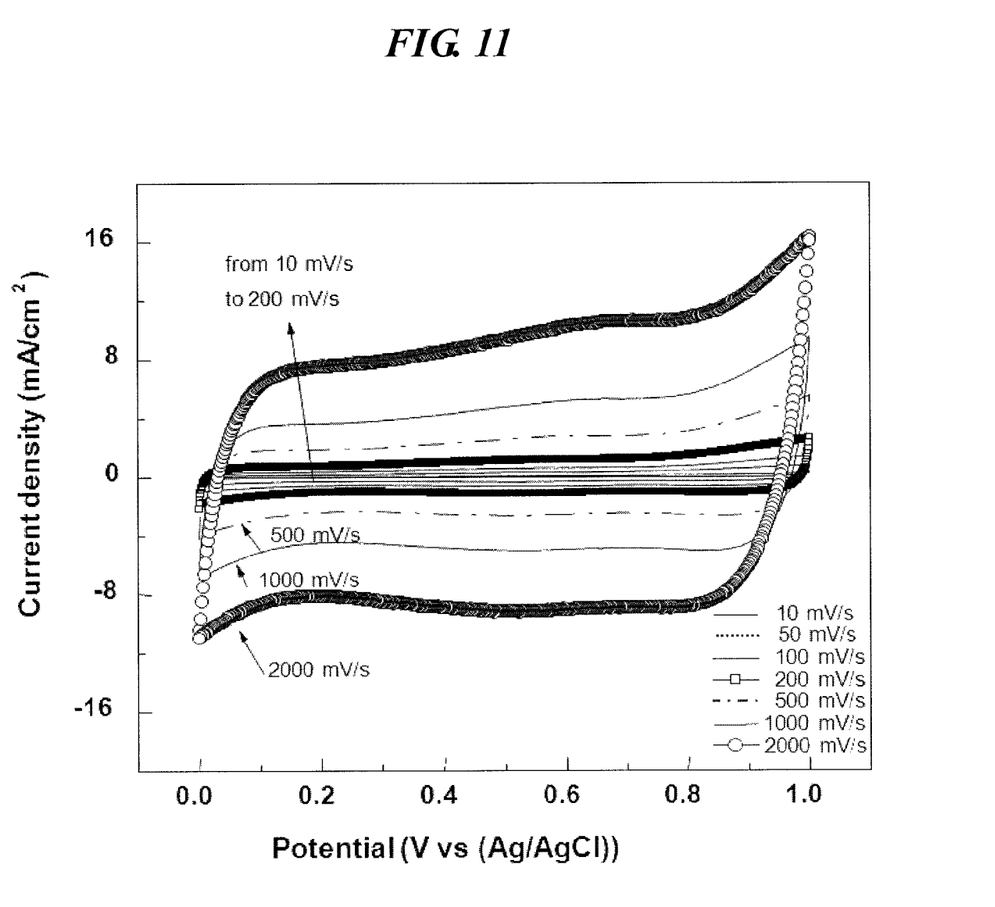
FIG. 11: supercapacitive properties of the electrode fabricated in Example 2.

FIG. 11 shows the supercapacitive properties of the electrode of Example 2. The thin manganese oxide-ruthenium oxide nanofiber web layer composed of nanoparticles, which had undergone electrospinning, thermal pressing and annealing at 300° C., had a large specific surface area. The thermal pressing improved the filling density of the nanofibers and the contact properties between the particles after annealing, leading to excellent sweep rate characteristics of the electrode. As shown in FIG. 11, rapid penetration and high reactivity of the electrolyte can be expected because of the nanofiber web structure. CV profiles close to a rectangle were observed at varying sweep rates from 10 to 2,000 mV/s. The CV profiles were much closer to a rectangle than those of the electrode fabricated without undergoing thermal pressing.

Figure 12:
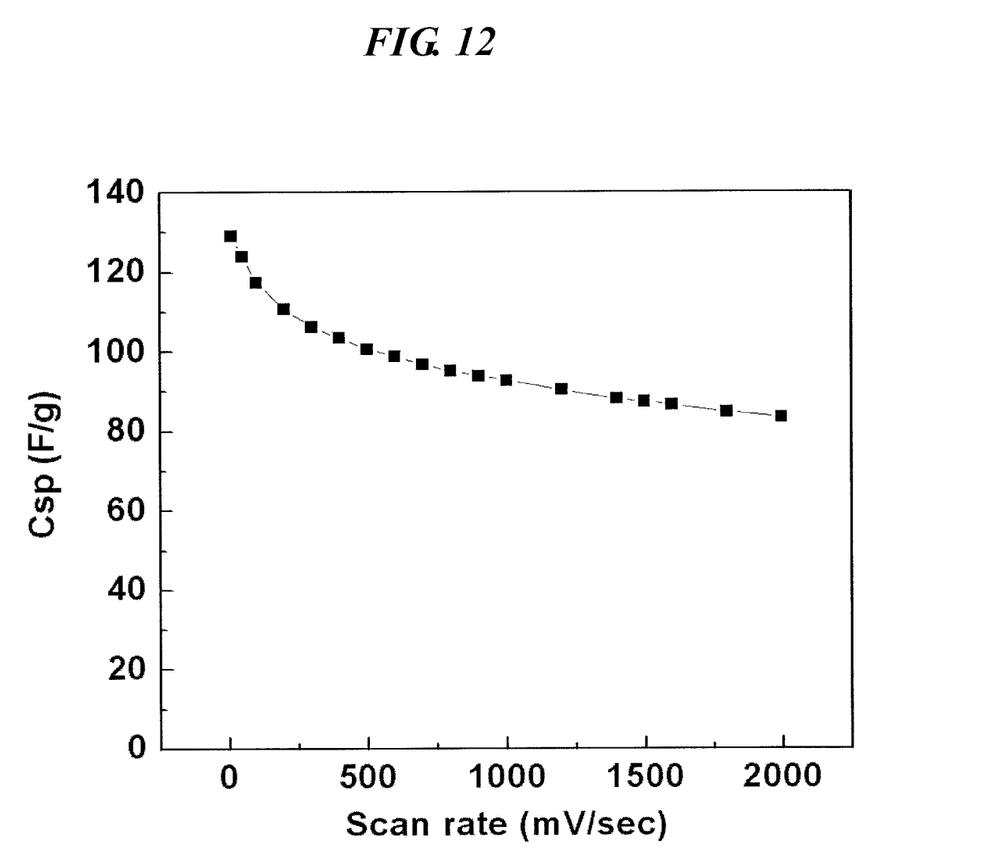
FIG. 12: supercapacitive properties of the electrode fabricated in Example 2 at varying sweep rates.

FIG. 12 shows the specific capacitance properties of the electrode of Example 2 at varying scan rates from 10 to 2,000 mV/s. The electrode had an initial capacity of 130 F/g at a sweep rate of 10 mV/s, which was slightly lower than the capacity of the electrode using the manganese oxide-ruthenium oxide having undergone primary annealing at 180° C. and secondary annealing at 300° C. However, the initial capacity of the electrode can be increased to a sufficient level by optimizing the fabrication conditions. The electrode had a specific capacitance as high as 85 F/g, which corresponds to 65% of the initial specific capacitance, even at a high scan rate of 2,000 mV/s.

Although the ruthenium oxide as the conductive metal oxide was used in the foregoing examples, no particular limitation is imposed on the kind of the conductive metal oxide. Also, the atomic ratio between the manganese oxide and the conductive metal oxide can be varied according to the intended performance of a supercapacitor.

While the invention has been described with respect to the above specific embodiments, it should be recognized that various modifications and changes may be made to the invention by those skilled in the art which also fall within the scope of the invention as defined by the appended claims.

What is claimed is:

1. A method for fabricating the electrode for a supercapacitor, consisting of:
   mixing a manganese oxide precursor, a precursor of a conductive metal oxide having a higher electrical conductivity than manganese oxide, and a polymer, and a solvent, to prepare a spinning solution;
   spinning the spinning solution on a current collector under an electric field to form a web of entangled ultrafine fibers, the ultrafine fiber web being composed of the manganese oxide precursor, the conductive metal oxide precursor, and the polymer, wherein the ultrafine fibers have an average diameter of 50 to 3000 nm;
   performing primary thermal treatment of the ultrafine fiber web to partially or completely melt the polymer present in the ultrafine fiber web, the thermal treatment being performed by a process selected from the group consisting of thermal pressing, thermal pressurization, and annealing; and
   removing the polymer from the ultrafine fiber web by secondary thermal treatment to form a porous composite metal oxide layer,
   wherein the equivalent ratio of the manganese oxide to the conductive metal oxide, (manganese oxide)$_{1-x}$(conductive metal oxide)$_x$, present in the porous composite metal oxide layer is (1-x):x, wherein $0.1 \leq x \leq 0.5$.

2. The method of claim 1, wherein the manganese oxide precursor is selected from the group consisting of manganese (II) acetylacetonate, manganese (III) acetylacetonate, manganese (III) acetate hydrate, manganese (III) acetate dihydrate, manganese (III) acetate tetrahydrate, manganese (II) nitrate hydrate, manganese (II) chloride, manganese (II) chloride hydrate, manganese (III) chloride tetrahydrate, manganese (II) sulfate hydrate, manganese (II) sulfate monohydrate, and a mixture thereof.

3. The method of claim 1, wherein the metal of the conductive metal oxide precursor is selected from the group consisting of Ru, Ir, Sn, In, Ni, Co, W, V and Mo, and the metal precursor is mixed with the polymer and spun, followed by thermally treating the resulting material to convert the metal precursor to ruthenium oxide, iridium oxide, nickel oxide, tin oxide, indium oxide, vanadium oxide, tungsten oxide, cobalt oxide, or molybdenum oxide.

4. The method of claim 1, wherein the polymer is selected from the group consisting of polyvinyl acetate or a copolymer thereof, polyurethane or a copolymer thereof, cellulose derivative, poly(methyl methacrylate), poly(methyl acrylate), a polyacrylic copolytner, polyvinyl alcohol, polyfurfuryl alcohol, polystyrene or a copolymer thereof, a polyalkylene oxide or a copolymer thereof, a polycarbonate, polyvinyl chloride, polycaprolactone, polyvinylpyrrolidone, polyvinyl fluoride, a polyvinylidene fluoride copolymer, a polyamide, and a mixture thereof.

5. The method of claim 1, wherein the solvent is selected from the group consisting of dimethylformamide (DMF), acetone, tetrahydrofuran, toluene, water, and a mixture thereof.

6. The method of claim 1, wherein the thermal pressing or the thermal pressurization is performed by applying a pressure to the ultrafine fiber web at a temperature above the glass transition temperature of the polymer.

7. The method of claim 1, wherein the annealing is performed at a temperature ranging from the glass transition temperature of the polymer to 200° C.

8. The method of claim 1, wherein the secondary thermal treatment is performed at a temperature of 300 to 600° C.

9. The method of claim 1, wherein the spinning is performed by electrospinning, melt-blowing, flash spinning, or electrostatic melt-blowing.

* * * * *

UNITED STATES PATENT AND TRADEMARK OFFICE
CERTIFICATE OF CORRECTION

| | | |
|---|---|---|
| PATENT NO. | : 8,609,018 B2 | Page 1 of 1 |
| APPLICATION NO. | : 12/580098 | |
| DATED | : December 17, 2013 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 446 days.

Signed and Sealed this
Seventh Day of April, 2015

Michelle K. Lee
*Director of the United States Patent and Trademark Office*